(12) United States Patent
Kurota et al.

(10) Patent No.: US 10,295,889 B2
(45) Date of Patent: May 21, 2019

(54) PROJECTION OPTICAL APPARATUS AND PROJECTOR WITH DAMPING MECHANISM

(71) Applicant: SEIKO EPSON CORPORATION, Tokyo (JP)

(72) Inventors: Ippei Kurota, Matsumoto (JP); Hiroshi Tsuchitani, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 3 days.

(21) Appl. No.: 15/872,795

(22) Filed: Jan. 16, 2018

(65) Prior Publication Data
US 2018/0217477 A1   Aug. 2, 2018

(30) Foreign Application Priority Data
Jan. 30, 2017   (JP) .................. 2017-013922

(51) Int. Cl.
| | | |
|---|---|---|
| G03B 17/54 | (2006.01) | |
| G02F 1/13 | (2006.01) | |
| H04N 9/31 | (2006.01) | |
| H04N 5/64 | (2006.01) | |
| G03B 21/28 | (2006.01) | |
| G03B 21/14 | (2006.01) | |

(52) U.S. Cl.
CPC .............. *G03B 17/54* (2013.01); *G02F 1/13* (2013.01); *G03B 21/145* (2013.01); *G03B 21/28* (2013.01); *H04N 5/64* (2013.01); *H04N 9/3141* (2013.01)

(58) Field of Classification Search
CPC ........... G03B 17/54; G03B 21/28; G02F 1/13; H04N 5/64; H04N 9/3141
See application file for complete search history.

(56) References Cited

U.S. PATENT DOCUMENTS

2004/0095767 A1*  5/2004  Ohmae ................. F21S 10/007
                                                                    362/293
2015/0022789 A1*  1/2015  Sato ...................... G03B 21/145
                                                                    353/98

FOREIGN PATENT DOCUMENTS

| JP | 2007-078859 A | 3/2007 |
|---|---|---|
| JP | 2012-155203 A | 8/2012 |
| JP | 2012-226033 A | 11/2012 |
| JP | 2015-145887 A | 8/2015 |

* cited by examiner

*Primary Examiner* — Cara E Rakowski
*Assistant Examiner* — Magda Cruz
(74) *Attorney, Agent, or Firm* — Oliff PLC

(57) ABSTRACT

A projection optical apparatus includes an optical system and a projection optic enclosure that accommodates the optical system. The optical system includes a first optical system on which the image light is incident, and the projection optic enclosure includes a first accommodation section that accommodates the first optical system and includes a flange section (supported section) supported by the image forming apparatus and a first wall section and a second wall section that face each other in a first direction (Y direction) that intersects the direction along a line that connects the flange section to the center of gravity of the projection optical apparatus.

9 Claims, 9 Drawing Sheets

PROJECTION OPTICAL APPARATUS AND PROJECTOR WITH DAMPING MECHANISM

BACKGROUND

1. Technical Field

The present invention relates to a projection optical apparatus and a projector.

2. Related Art

There has been a known projector including a light modulator that modulates light emitted from a light source in accordance with image information and a projection optical apparatus that projects the light modulated by the light modulator on a projection surface. Further, there has been a proposed projector that incorporates a projection optical apparatus including a short-throw lens and other components for allowing projection from a position close to the projection surface (see JP-A-2012-226033, for example) and a proposed projector that incorporates a projection optical apparatus that changes the direction of light outputted from a light modulator and projects the light.

The projector described in JP-A-2012-226033 includes an optical unit including a projection optical apparatus (projection lens) and a holder, an exterior enclosure, and other components.

The projection lens includes a plurality of lenses, such as a front-side lens that contributes to an increase in the divergent angle of projected image light, and a lens barrel and is configured to be capable of proximity projection. The front-side lens is disposed in a rearmost position on the optical path among the plurality of lenses and so formed that the outer dimension of the front-side lens is greater than the outer dimension of the lens barrel.

The lens barrel is provided with a flange section, and the flange section of the projection lens is fixed to the holder with screws.

Impact could undesirably be applied to a projector, for example, by rough handling of the projector when it is installed on a desktop or any other surface. In the projector described in JP-A-2012-226033, in which the projection lens includes the front-side lens and other components, the impact could undesirably break the flange section, the holder, a member close to the flange section or the holder, or any other component because the center of gravity of the projection lens is located in a position separate from the flange section.

In a projector including a projection optical apparatus that is heavier than the projection lens described in JP-A-2012-226033 and a projector including a projection lens having a center of gravity located in a position further separate from the flange section, significant breakage could undesirably occur due to an increase in load acting on the projector.

SUMMARY

An advantage of some aspects of the invention is to solve at least a part of the problems described above, and the invention can be implemented as the following forms or application examples.

APPLICATION EXAMPLE 1

A projection optical apparatus according to this application example is a projection optical apparatus attached to an image forming apparatus that outputs image light, and the projection optical apparatus includes an optical system and a projection optic enclosure that accommodates the optical system. The optical system includes a first optical system on which the image light is incident, and the projection optic enclosure includes a first accommodation section that accommodates the first optical system and includes a supported section supported by the image forming apparatus and a first wall section and a second wall section that face each other in a first direction that intersects a direction along a line that connects the supported section to a center of gravity of the projection optical apparatus.

According to the configuration described above, the projection optical apparatus can be attached to the image forming apparatus by using the first wall section and the second wall section in addition to the supported section. Therefore, even in the configuration in which the projection optical apparatus has a large weight or has the center of gravity in a position separate from the supported section, for example, to increase the divergent angle of the image light incident on the projection optical apparatus or to change the projection direction, a projection optical apparatus stably supported by the image forming apparatus can be provided.

APPLICATION EXAMPLE 2

A projector according to this application example is a projector that projects image light, and the projector includes an image forming apparatus that includes a light source, a light modulator, and an exterior enclosure and outputs the image light, a projection optical apparatus that is removably supported by the image forming apparatus and projects the image light, and a damping mechanism that is supported by the image forming apparatus or the projection optical apparatus and absorbs a variation in torque between the image forming apparatus and the projection optical apparatus.

According to the configuration described above, in a case where the projector is installed on a desktop or any other surface or in other cases, even when impact is applied to the image forming apparatus, force applied to the projection optical apparatus due to the impact can be reduced by the damping mechanism. Therefore, even in the configuration including the projection optical apparatus having a large weight, for example, to increase the divergent angle of the image light incident on the projection optical apparatus or to change the projection direction, a projector that prevents breakage of the image forming apparatus and the projection optical apparatus and excels in impact resistance can be provided.

APPLICATION EXAMPLE 3

In the projector according to the application example described above, the projection optical apparatus includes an optical system and a projection optic enclosure that accommodates the optical system. The optical system includes a first optical system on which the image light is incident. The projection optic enclosure includes a first accommodation section that accommodates the first optical system and includes a supported section supported by the image forming apparatus and a first wall section and a second wall section that face each other in a first direction that intersects a direction along a line that connects the supported section to a center of gravity of the projection optical apparatus. The damping mechanism is supported by the image forming apparatus and includes a standing section that stands from the exterior enclosure and a damper that is so supported by the standing section as to be disposed between the first wall section and the second wall section and juts out relative to the standing section by an amount that changes in accordance with pressing force produced by the first wall section or the second wall section.

According to the configuration described above, in the projection optical apparatus, the supported section is supported by the image forming apparatus, and the damper of the damping mechanism can be supported between the first wall section and the second wall section. The damper is configured to jut out relative to the standing section of the damping mechanism by an amount that changes in accordance with the pressing force produced by the first wall section or the second wall section. Therefore, when impact is applied to the image forming apparatus, force that causes the center of gravity to swing relative to the supported section as a fixed end acts on the projection optical apparatus. The first wall section and the second wall section therefore press the damper, but the pressing force is reduced by the damper. As a result, breakage of the supported section, a member that supports the supported section, and other portions can be avoided. Therefore, even in the configuration including the projection optical apparatus having a large weight or having the center of gravity in a position separate from the supported section, for example, to increase the divergent angle of the image light incident on the projection optical apparatus or to change the projection direction, a projector that excels in impact resistance can be provided.

APPLICATION EXAMPLE 4

In the projector according to the application example described above, it is preferable that the optical system includes a second optical system that changes a traveling direction of light having exited out of the first optical system and has a second optical axis along a direction that intersects a first optical axis of the first optical system, that the projection optic enclosure has a second accommodation section that accommodates the second optical system, and that the first wall section and the second wall section are provided on the second accommodation section.

According to the configuration described above, the first wall section and the second wall section are provided on the second accommodation section. As a result, even in the case of a projection optical apparatus having the center of gravity shifted toward the second accommodation section, vibration of the projection optical apparatus due to impact can be efficiently suppressed. A projector that projects an image in a direction different from the traveling direction of the light outputted from the image forming apparatus and excels in impact resistance can be provided.

APPLICATION EXAMPLE 5

In the projector according to the application example described above, it is preferable that the first wall section and the second wall section are provided on opposite sides of the second accommodation section in a direction that intersects the first optical axis and the second optical axis, and that the damping mechanism includes a pair of the standing sections and a pair of the dampers in correspondence with the first wall section and the second wall section provided on the opposite sides of the second accommodation section.

According to the configuration described above, the first wall section, the second wall section, the standing sections, and the dampers are provided on opposite sides of the second accommodation section, whereby vibration of the projection optical apparatus due to impact can be suppressed in a well-balanced manner. A projector that further excels in impact resistance can be provided.

Further, since the first wall sections, the second wall sections, and the damping mechanism can be configured with the amounts of overhang thereof from the second accommodation section suppressed in the direction along the second optical axis, an increase in size of the projector in the direction along the second optical axis can be suppressed.

APPLICATION EXAMPLE 6

In the projector according to the application example described above, the first wall section and the second wall section preferably have sides facing each other and formed of flat surfaces.

According to the configuration described above, the damper can be stably pressed by the first wall section and the second wall section with no precise arrangement of the damper in the direction along the flat surfaces. Further, moving the damper in the direction along the flat surfaces allows the damper to be disposed between the first wall section and the second wall section. A projector including the damping mechanism that allows the damper to be readily disposed in a predetermined position can be provided.

APPLICATION EXAMPLE 7

In the projector according to the application example described above, it is preferable that the flat surfaces are surfaces that intersect the first optical axis.

According to the configuration described above, even in the configuration in which the member that supports the supported section of the projection optical apparatus is movable in a direction that intersects the first optical axis, that is, the configuration including a shift mechanism that allows the image forming apparatus to move the projection optical apparatus, the damping mechanism is allowed to function. Therefore, even in the configuration including not only the projection optical apparatus having a large weight or having the center of gravity in a position separate from the supported section but the shift mechanism, a projector that excels in impact resistance can be provided.

APPLICATION EXAMPLE 8

In the projector according to the application example described above, it is preferable that a state of the damping mechanism is switched by pivotal motion of the standing section between a first state in which the damper is located in a space between the first wall section and the second wall section and a second state in which the damper is located outside the space between the first wall section and the second wall section.

According to the configuration described above, the state of the damping mechanism is switched between the first state and the second state by the pivotal motion of the standing section. The state in which the damping mechanism functions and the state in which the damping mechanism does not function can therefore be readily switched from one to the other without disassembly of the damping mechanism, whereby a projector including the damping mechanism that is easily handled can be provided.

APPLICATION EXAMPLE 9

In the projector according to the application example described above, it is preferable that the damping mechanism is configured to be attachable to and detachable from the exterior enclosure.

According to the configuration described above, to mount the projection optical apparatus that includes the first wall section and the second wall section on the image forming apparatus, the damping mechanism is mounted on the exterior enclosure, and to mount another projection optical apparatus that includes no first wall section or second wall section and therefore has a small weight on the image forming apparatus, the damping mechanism can be removed from the exterior enclosure. A projector that allows projection optical apparatus having a variety of weights to be attached to and detached from the projector and has a satisfactory exterior appearance of the projector on which the other projection optical apparatus is mounted can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
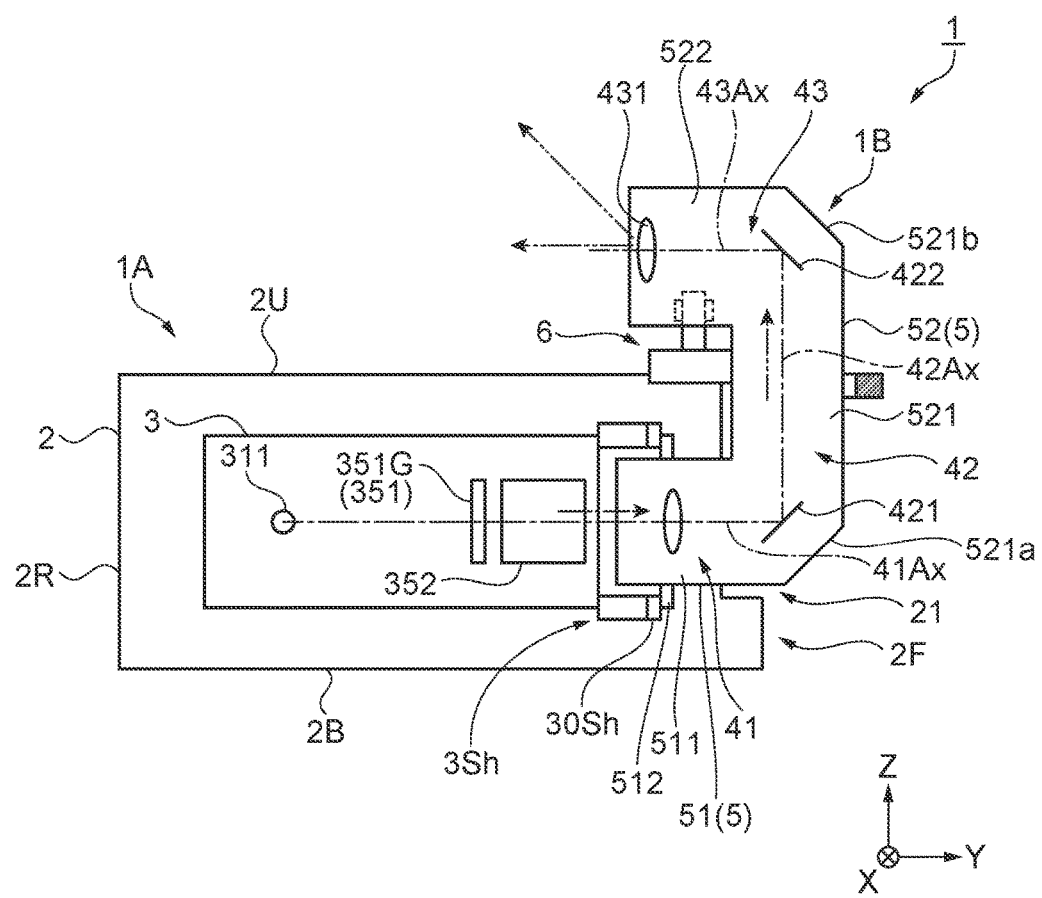
FIG. 1 is a side view diagrammatically showing a primary configuration of a projector according to an embodiment of the invention.

An embodiment of the invention will be described below with reference to the drawings. In the following drawings, each component is so drawn at a scale or a ratio different from an actual value as to be large enough to be recognizable in the drawings.

A projector according to the present embodiment will be described below.

The projector according to the present embodiment modulates light emitted from a light source in accordance with image information and enlarges and projects the modulated light on a screen or any other projection surface.

Primary Configuration of Projector

Figure 2:
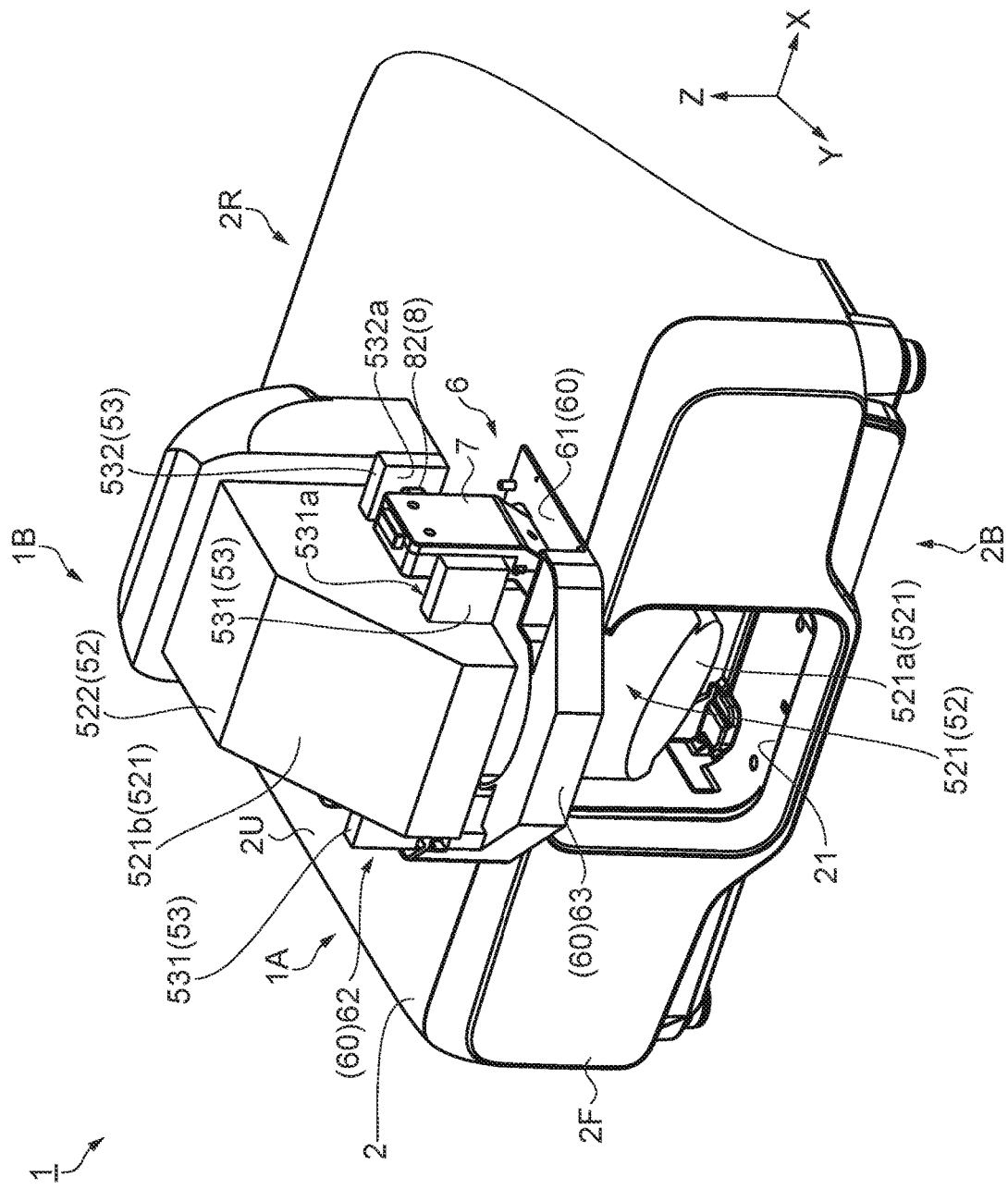
FIG. 2 is a perspective view showing the exterior appearance of the projector according to the present embodiment.

FIG. 1 is a side view diagrammatically showing a primary configuration of a projector 1 according to the present embodiment. FIG. 2 is a perspective view showing the exterior appearance of the projector 1.

The projector 1 includes an image forming apparatus 1A, a projection optical apparatus 1B, which is so supported by the image forming apparatus 1A that the projection optical apparatus 1B can be attached to and detached from the image forming apparatus 1A, and a damping mechanism 6 (see FIG. 2), as shown in FIGS. 1 and 2. Although not shown, the projector 1 further includes a decorative member that covers part of the projection optical apparatus 1B and the damping mechanism 6.

The image forming apparatus 1A includes an optical unit 3, which includes a light source 311 and light modulators 351, as shown in FIG. 1, and outputs image light according to image information.

The projection optical apparatus 1B includes an optical system having a roughly U-letter shaped optical path, successively deflects twice the direction of the light outputted from the image forming apparatus 1A, and enlarges and projects the light on a projection surface disposed on the side opposite the projection optical apparatus 1B with respect to the image forming apparatus 1A.

The damping mechanism 6 includes a damper 8, which is allowed to come into contact with the projection optical apparatus 1B, and is supported by the image forming apparatus 1A, as shown in FIG. 2. The damping mechanism 6 is configured to reduce impact applied to the image forming apparatus and transmitted to the projection optical apparatus 1B. For convenience of description, it is assumed that the direction in which the image forming apparatus 1A outputs light is a frontward direction (+Y direction), the direction in which the light outputted from the image forming apparatus 1A travels after it is deflected once by the projection optical apparatus 1B is an upward direction (+Z direction), and the direction extending outward from the right side of the projector 1 viewed from the front is a rightward direction (+X direction).

Primary Configuration of Image Forming Apparatus

Figure 3:
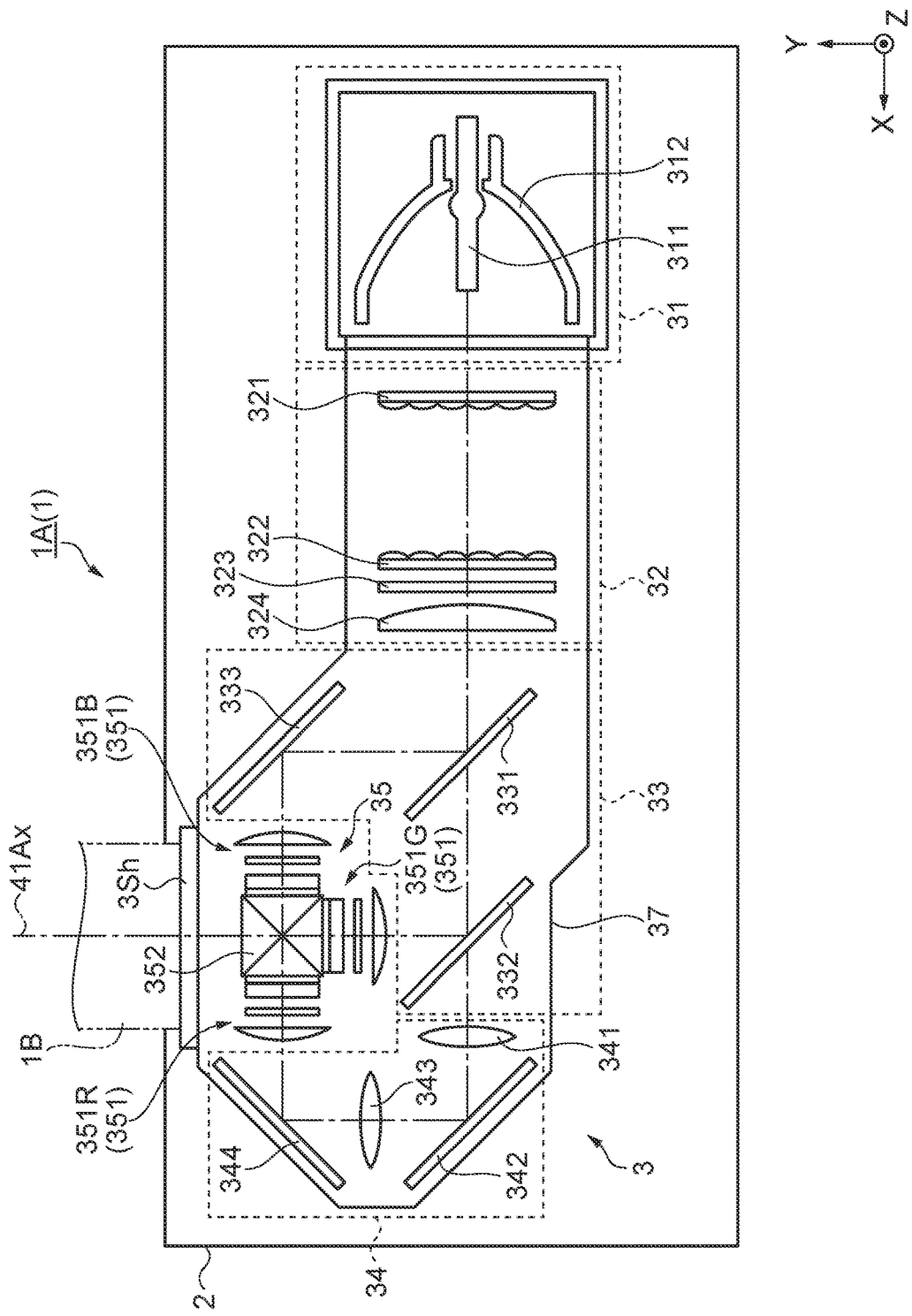
FIG. 3 is a diagrammatic view showing a primary configuration of an image forming apparatus in the present embodiment.
Figure 4:
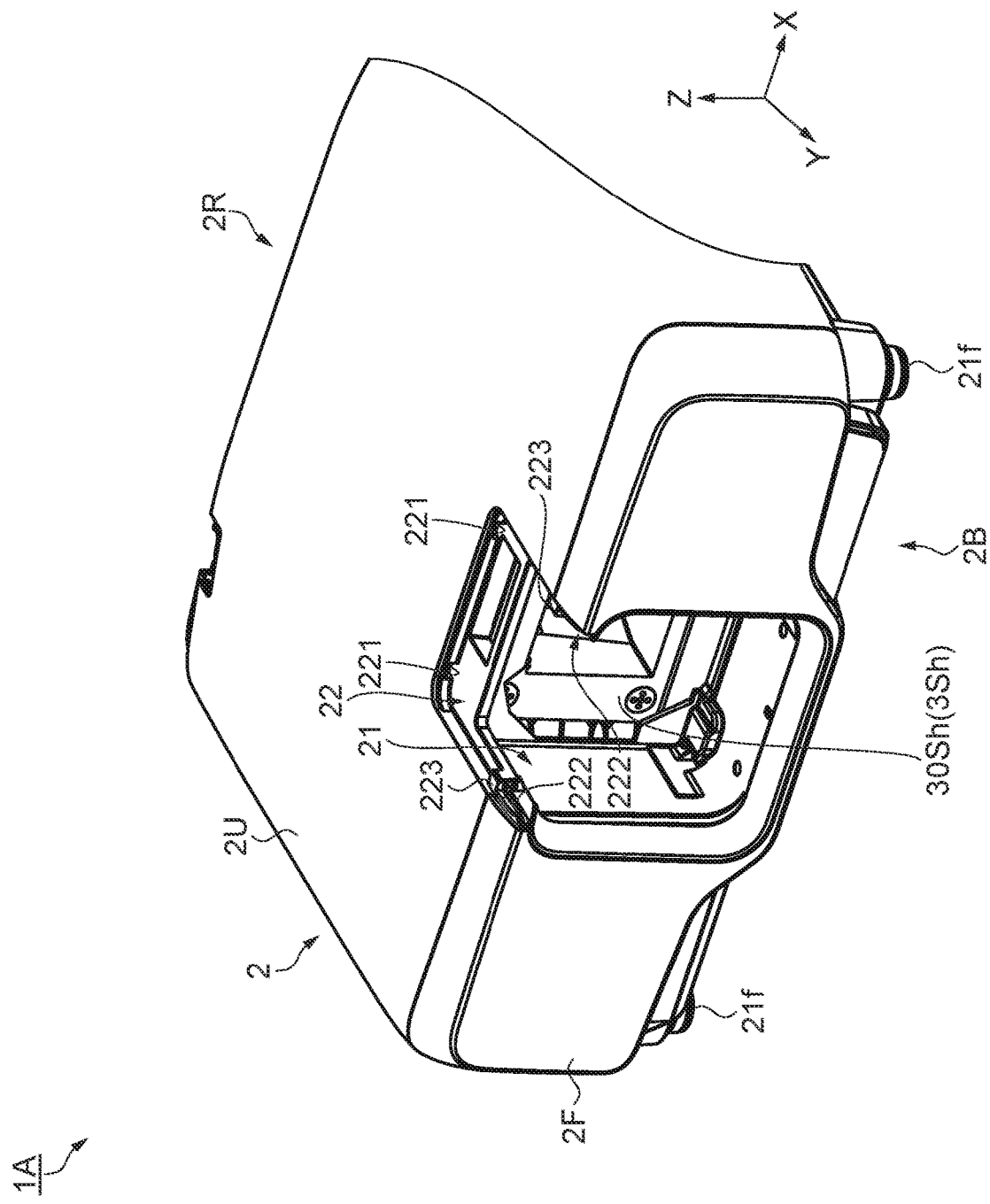
FIG. 4 is a perspective view of the image forming apparatus in the present embodiment.

FIG. 3 is a diagrammatic view showing a primary configuration of the image forming apparatus 1A. FIG. 4 is a perspective view of the image forming apparatus 1A.

The image forming apparatus 1A includes an exterior enclosure 2, a controller (not shown) accommodated in the exterior enclosure 2, the optical unit 3, and a lens shift mechanism 3Sh, as shown in FIG. 3. Although not shown, the image forming apparatus 1A further includes a power supply that supplies the light source 311, the controller, and other components with electric power and a cooler that cools the optical unit 3 and the power supply.

The exterior enclosure 2 is a combination of a plurality of members and has a front surface section 2F, which forms the front side (+Y side), an upper surface section 2U, which forms the upper side (+Z side), a rear surface section 2R, which forms the rear side (−Y side), a bottom surface section 2B, which forms the bottom surface, and other sections, as shown in FIG. 4.

An opening 21, into which part of the projection optical apparatus 1B is inserted, is provided in the front surface section 2F and the front side of the upper surface section 2U. A recessed section 22, which forms part of the edge of the opening 21 and is recessed from the surrounding portion, is formed in the upper surface section 2U.

The recessed section 22 is a portion into which the damping mechanism 6 is fit. The recessed section 22 will be described later in detail.

The bottom surface section 2B is provided with a plurality of legs 21f, which support the projector 1 when the projector 1 is installed on a desktop or any other surface. Although not shown, the exterior enclosure 2 is provided with an air intake port through which outside air is introduced, an air exhaust port through which heated air in the exterior enclosure 2 is exhausted out thereof, and other ports.

The controller includes a CPU (central processing unit), a ROM (read only memory), a RAM (random access memory), and other components, functions as a computer, and controls the action of the projector 1, for example, performs control relating to image projection. Although not shown, an operation panel and a remote control light receiver that are connected to the controller are disposed on the exterior enclosure 2, and operating the operation panel and a remote control allows a variety of types of setting and operation of the projector 1.

The optical unit 3 optically processes light outputted from the light source 311 and outputs the processed light to the projection optical apparatus 1B under the control of the controller.

The optical unit 3 includes a light source apparatus 31, an optical integration illumination system 32, a color separation system 33, a relay system 34, an optical apparatus 35, and an optical part enclosure 37, which arranges the optical parts described above in predetermined positions along the optical path, as shown in FIG. 3.

The light source apparatus 31 includes the light source 311, which is a discharge-type light source and formed, for example, of an ultrahigh-pressure mercury lamp or a metal halide lamp, a reflector 312, and other components. In the light source apparatus 31, the reflector 312 reflects light emitted from the light source 311 and directs the light toward the optical integration illumination system 32.

The optical integration illumination system 32 includes a first lens array 321, a second lens array 322, a polarization conversion element 323, and a superimposing lens 324.

The first lens array 321 has a configuration in which lenslets are arranged in a matrix and divides the light outputted from the light source apparatus 31 into a plurality of sub-light fluxes. The second lens array 322 has roughly the same configuration as that of the first lens array 321 and roughly superimposes, along with the superimposing lens 324, the sub-light fluxes on one another on each of the light modulators 351. The polarization conversion element 323 has the function of aligning the polarization directions of the randomly polarized light fluxes having exited out of the second lens array 322 with one another to form roughly one type of polarized light useable by the light modulators.

The color separation system 33 includes two dichroic mirrors 331 and 332 and a reflection mirror 333 and has the function of separating the light having exited out of the optical integration illumination system 32 into three color light fluxes, red light (hereinafter referred to as "R light"), green light (hereinafter referred to as "G light"), and blue light (hereinafter referred to as "B light").

The relay system 34 includes a light-incident-side lens 341, a relay lens 343, and reflection mirrors 342 and 344 and has the function of guiding the separated R light from the color separation system 33 to a light modulator 351 for R light. The optical unit 3 has a configuration in which the relay system 34 guides the R light, but not necessarily, and may instead guide the B light.

The optical apparatus 35 includes the light modulators 351 provided for the respective color light fluxes (reference character 351R denotes light modulator for R light, reference character 351G denotes light modulator for G light, and reference character 351B denotes light modulator for B light) and a cross dichroic prism 352 as a light combining optical apparatus.

The light modulators 351 each include a transmissive liquid crystal panel, a light-incident-side polarizer disposed on the light incident side of the liquid crystal panel, and a light-exiting-side polarizer disposed on the light exiting side of the liquid crystal panel.

The light modulators 351 each have a rectangular image formation area in which a plurality of minute pixels that are not shown are formed in a matrix. The pixels each have light transmittance set in accordance with image information, so that a display image is formed in the image formation area. The color light fluxes are modulated by the light modulators 351 and then outputted to the cross dichroic prism 352.

The cross dichroic prism 352 is formed by bonding four rectangular prisms to each other and therefore has a roughly square shape in a plan view, and dielectric multilayer films are formed along the interfaces between the bonded rectangular prisms. The cross dichroic prism 352, in which the dielectric multilayer films reflect the R light and the B light modulated by the light modulators 351R and 351B and transmit the G light modulated by the light modulator 351G, combines the three color modulated light fluxes with one another.

The lens shift mechanism 3Sh, although will not be described in detail, includes a head body attached to the optical part enclosure 37, a movable member 30Sh, which supports the projection optical apparatus 1B and is so supported by the head body as to be movable, a motorized drive mechanism (not shown) that moves the movable member 30Sh, and other components. The lens shift mechanism 3Sh moves the projection optical apparatus 1B in a direction perpendicular to a first optical axis 41Ax, which will be described later, in accordance with operation performed on the operation panel or the remote control. The lens shift mechanism 3Sh in the present embodiment is configured to be capable of moving the projection optical apparatus 1B in two directions (X direction and Z direction).

Primary Configuration of Projection Optical Apparatus

The projection optical apparatus 1B includes the optical system having a roughly U-letter shaped optical path, as described above, and enlarges and projects the combined light from the cross dichroic prism 352 on the projection surface disposed behind the projector 1 (on −Y side).

The projection optical apparatus 1B includes a first optical system 41, a second optical system. 42, a third optical system 43, and a projection optic enclosure 5, which accommodates the optical systems, as shown in FIGS. 1 and 2.

The light outputted from the image forming apparatus 1A enters the first optical system 41. The first optical system 41 includes a plurality of lenses (FIG. 1 shows only one of the lenses) arranged along the first optical axis 41Ax, refracts the light having exited out of the cross dichroic prism 352 in the image forming apparatus 1A, and causes the light to exit toward the +Y side.

The second optical system 42 includes a first reflection mirror 421 and a second reflection mirror 422 and changes the traveling direction of the light having exited out of the first optical system 41, as shown in FIG. 1.

The first reflection mirror 421 is disposed in a position in front of the first optical system 41 and reflects the light having exited out of the first optical system 41 in the +Z direction. The second reflection mirror 422 reflects the light having traveled in the +Z direction toward the −Y side. The optical axis of the light reflected off the first reflection mirror 421 is called a second optical axis 42Ax, and the optical axis of the light reflected off the second reflection mirror 422 is called a third optical axis 43Ax. That is, the second optical system 42 has the second optical axis 42Ax extending along a direction that intersects the first optical axis 41Ax of the first optical system 41. The second optical system 42 may have a lens and other optical parts in addition to the first reflection mirror 421 and the second reflection mirror 422.

The third optical system 43 includes a plurality of lenses (FIG. 1 shows a lens 431 disposed in a position closest to the light exiting side among the plurality of lenses) arranged along the third optical axis 43Ax, refracts the light having exited out of the second optical system 42, and causes the light to exit toward the −Y side. The third optical system 43 further includes a lens that increases the divergent angle of the light incident thereon to increase the divergent angle of the light having exited out of the second optical system and performs upward tilt projection. That is, the projection optical apparatus 1B projects an image in a position behind the projector 1 (−Y side) and above the projector 1 in the upward/downward direction (+Z direction). Further, the projection optical apparatus 1B allows projection in a position close to the projection surface, and the projector 1, on which the projection optical apparatus 1B is mounted, functions as a short-throw projector.

Figure 5:
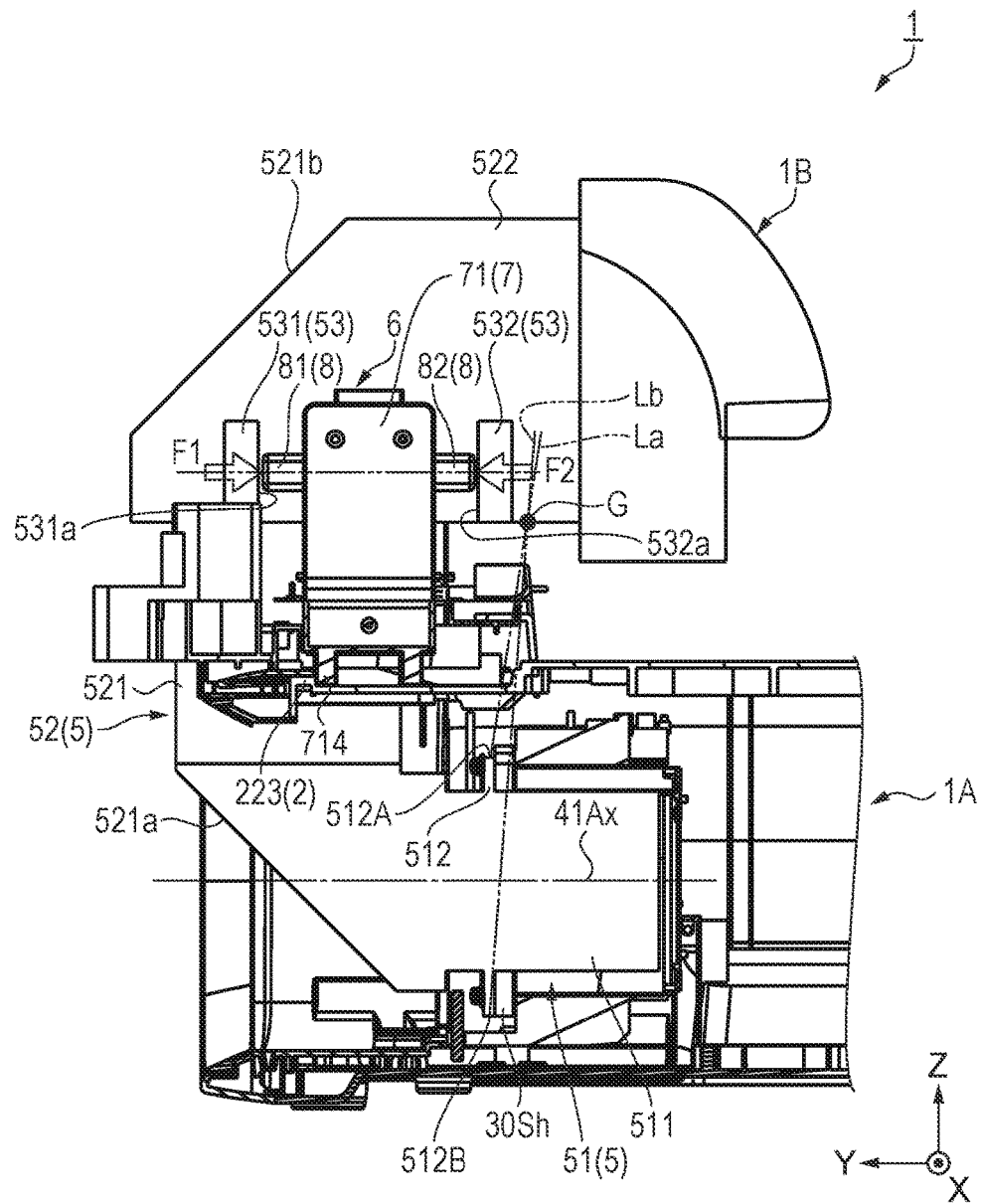
FIG. 5 is a partial cross-sectional view of the projector according to the present embodiment.

FIG. 5 is a partial cross-sectional view of the projector 1 and shows the damping mechanism 6 and the projection optical apparatus 1B viewed from the +X side.

The projection optic enclosure 5 includes a first accommodation section 51, which accommodates the first optical system 41, a second accommodation section 52, which accommodates the second optical system 42 and the third optical system 43, and damper receivers 53, as shown in FIGS. 1 and 5.

The first accommodation section 51 includes a cylindrical section 511 and a flange section 512, which serves as a supported section that protrudes from the cylindrical section 511, as shown in FIG. 5.

The cylindrical section 511 extends along the first optical axis 41Ax.

The flange section 512 protrudes from the cylindrical section 511 in the direction that intersects the first optical axis 41Ax and is formed in a rectangular shape in a plan view. A plurality of screw insertion holes (not shown) through which screws are inserted are formed in the flange section 512. The projection optical apparatus 1B is fixed to the movable member 30Sh with the screws inserted through the screw insertion holes. The projection optical apparatus 1B, specifically, the flange section 512 (supported section) provided as part of the first accommodation section 51 is thus supported by the movable member 30Sh in the image forming apparatus 1A.

The second accommodation section 52 has a vertically extending section 521 and a horizontally extending section 522, as shown in FIGS. 1 and 5.

The vertically extending section 521 is connected to the first accommodation section 51, extends in the +Z direction, and accommodates the second optical system 42. The vertically extending section 521 has inclining walls 521a and 521b, which are respectively provided on the sides opposite the reflection surfaces of the first reflection mirror 421 and the second reflection mirror 422.

The horizontally extending section 522 is connected to the vertically extending section 521, extends in the −Y direction, and accommodates the third optical system 43.

The damper receivers 53 are provided on the right and left sides of the second accommodation section 52 (+X side and −X side), that is, on opposite sides of the second accommodation section 52 in the direction that intersects the first optical axis 41Ax and the second optical axis 42Ax, as shown in FIG. 2. The damper receivers 53 are formed in a bilateral symmetric manner, and the right (+X-side) damper receiver 53 will be representatively described.

The +X-side damper receiver 53 protrudes from the second accommodation section 52 in the +X direction and has a first wall section 531 and a second wall section 532, which are arranged in the frontward/rearward direction (Y direction), as shown in FIG. 5.

The first wall section 531 is provided on the +Y side relative to the second wall section 532. The first wall section 531 and the second wall section 532 are so formed that the sides thereof facing each other are flat surfaces. Specifically, the first wall section 531 has a first flat surface 531a, which faces the second wall section 532. The second wall section 532 has a second flat surface 532a, which faces the first flat surface 531a. That is, the first wall section 531 and the second wall section 532 face each other in the Y direction, so do the first flat surface 531a and the second flat surface 532a. The Y direction corresponds to a first direction. The first flat surface 531a and the second flat surface 532a are perpendicular to the first optical axis 41Ax and formed along the moving directions of the projection optical apparatus 1B moved by the lens shift mechanism 3Sh.

The projection optical apparatus 1B in the present embodiment has a center of gravity G in a position separate from the flange section 512, as shown in FIG. 5. Specifically, the center of gravity G is located in a position close to the horizontally extending section 522 as follows. In the Y direction, the center of gravity G is shifted from the flange section 512 toward the −Y side; in the Z direction, the center of gravity G is located in the vicinity of the −Z-side end of the horizontally extending section 522; and in the X direction, the center of gravity G is located roughly at the center of the projection optical apparatus 1B.

The projection optical apparatus 1B is so disposed that part of the first accommodation section 51 is inserted into the image forming apparatus 1A, part of the vertically extending section 521 is disposed in the opening 21, and the horizontally extending section 522 is located above the exterior enclosure 2 (upper surface section 2U), as shown in FIG. 1.

Primary Configuration of Damping Mechanism

A primary configuration of the damping mechanism 6 will next be described.

The damping mechanism 6 includes pivot units 7, as shown in FIG. 2, and a first state in which the pivot units 7 stand upright and a second state in which the pivot units 7 incline can be switched from one to the other.

Figure 6:
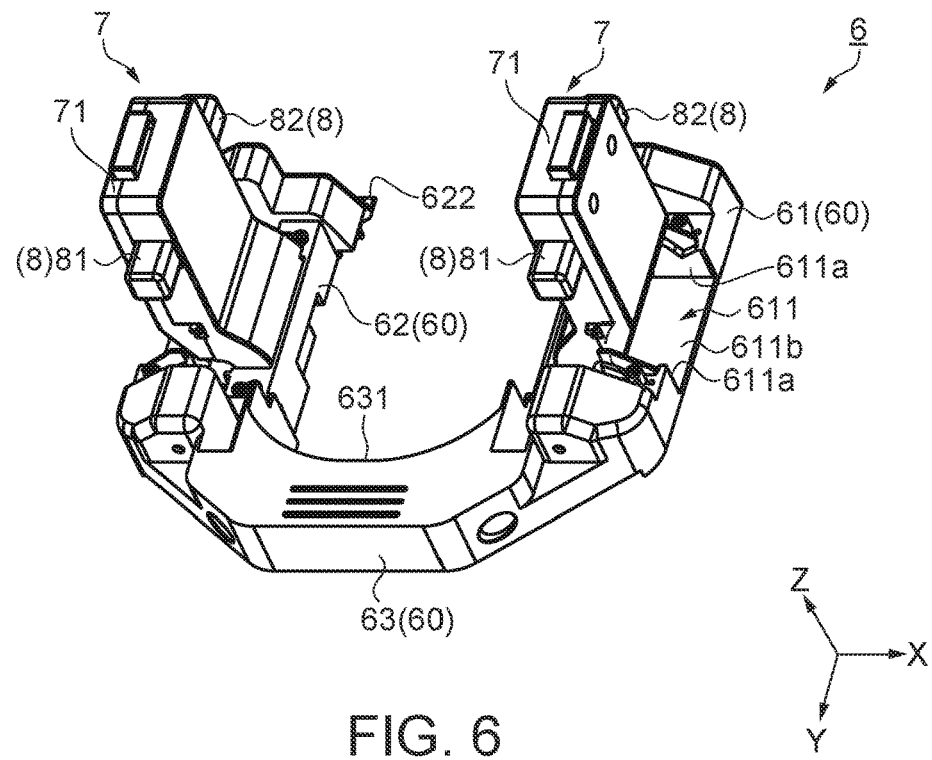
FIG. 6 is a perspective view of a damping mechanism in a first state in the present embodiment.
Figure 7:
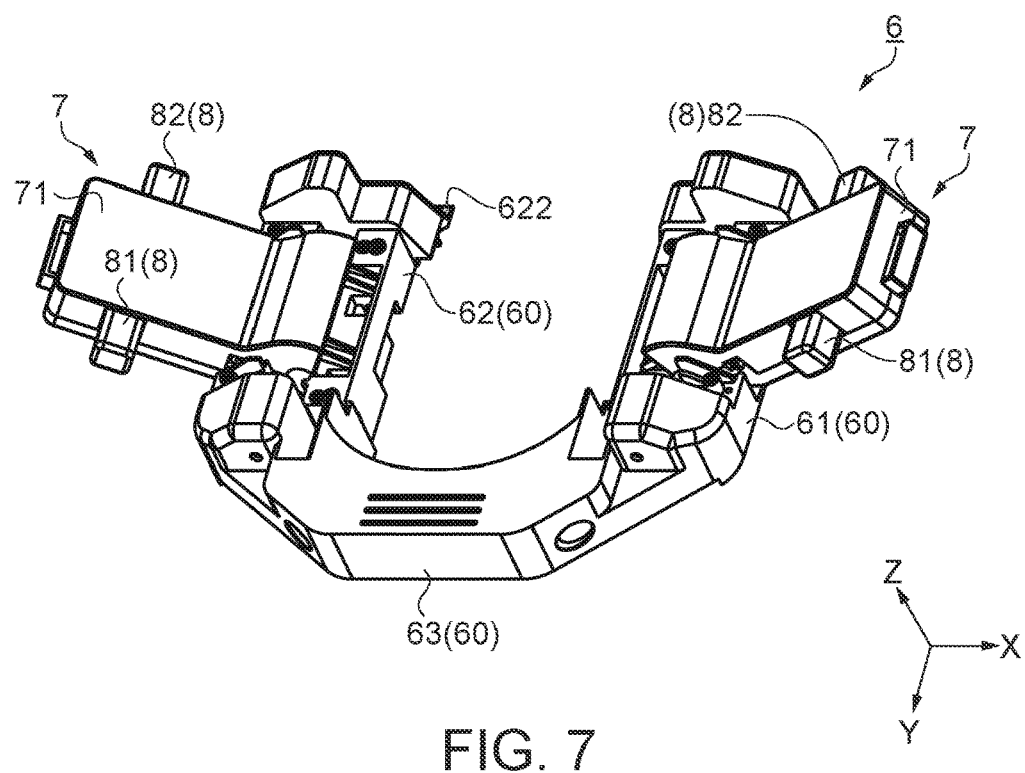
FIG. 7 is a perspective view of the damping mechanism in a second state in the present embodiment.

FIG. 6 is a perspective view of the damping mechanism 6 in the first state. FIG. 7 is a perspective view of the damping mechanism 6 in the second state.

The damping mechanism 6 includes a base section 60 and a pair of pivot units 7, each of which includes the damper 8, as shown in FIGS. 6 and 7, and the damping mechanism 6 is configured to be attachable to and detachable from the recessed section 22 of the exterior enclosure 2.

Referring back to FIG. 4, the recessed section 22 of the exterior enclosure 2 will first be described in detail.

The recessed section 22 is formed on the right and left sides of the opening 21 in the upper surface section 2U and on the −Y side of the opening 21 and provided with insertion holes 221, guide grooves 222, and protrusions 223, as shown in FIG. 4.

The insertion holes 221 are formed of a pair of insertion holes 221 formed in a −Y-side standing wall of the recessed section 22. The guide grooves 222 are formed in the right and left standing walls of the recessed section 22 and extend along the Y direction. The protrusions 223 are provided on the −Y side of the guide grooves 222 and protrude upward.

The base section 60 is fit into the recessed section (see FIG. 4) of the exterior enclosure 2 and pivotably supports the pair of pivot units 7.

Referring back to FIG. 2, the base section 60 includes mounting seat sections 61 and 62 located on the right and left sides of the projection optical apparatus 1B (vertically extending section 521), which protrudes from the exterior enclosure 2, and a connection section 63, which connects the mounting seat sections 61 and 62 to each other in front of the projection optical apparatus 1B.

The mounting seat section 61 is provided on the +X side of the projection optical apparatus 1B and has an outer shape longer in the Y direction than in the X direction, and a recessed section 611, which is recessed on the upper side, is formed at the Y-direction center of the mounting seat section 61, as shown in FIGS. 6 and 7. The recessed section 611 has a bottom surface 611b and facing surfaces 611a, which stand from the bottom surface 611b in the +Z direction and face each other in the Y direction. Bearing portions (not shown) that pivotably receive shaft sections 713, which are part of the pivot units 7 and will be described later, are formed in the facing surfaces 611a. Protrusions (not shown) to be inserted into the insertion holes 221 and the guide grooves 222 of the exterior enclosure 2 are formed on the mounting seat section 61.

The mounting seat section 62 is provided on the −X side of the projection optical apparatus 1B and has a roughly bilaterally symmetric shape of the mounting seat section 61, and bearing portions (not shown) that pivotably receive the shaft sections 713 of the corresponding pivot unit 7, are formed in the mounting seat section 62. A protrusion 622 (see FIGS. 6 and 7), which is inserted into the corresponding insertion hole 221 of the exterior enclosure 2, and a protrusion (not shown) that is inserted into the corresponding guide groove 222 are further formed on the mounting seat section 62, as in the case of the mounting seat section 61.

The connection section 63 has an inner surface 631, which connects the +Y side of the mounting seat section 61 and the +Y side of the mounting seat section 62 to each other and is slightly separate from the outer surface of the vertically extending section 521 of the projection optical apparatus 1B.

The pair of pivot units 7 are provided in correspondence with the damper receivers 53, which are provided on opposite sides of the second accommodation section 52. The pair of pivot units 7 have the same shape, with one of the pivot units 7 pivotably supported by the mounting seat section 61 and the other pivot unit 7 pivotably supported by the mounting seat section 62.

The pivot unit 7 pivotably supported by the mounting seat section 61 (+X-side pivot unit 7) will be representatively described.

Figure 8:
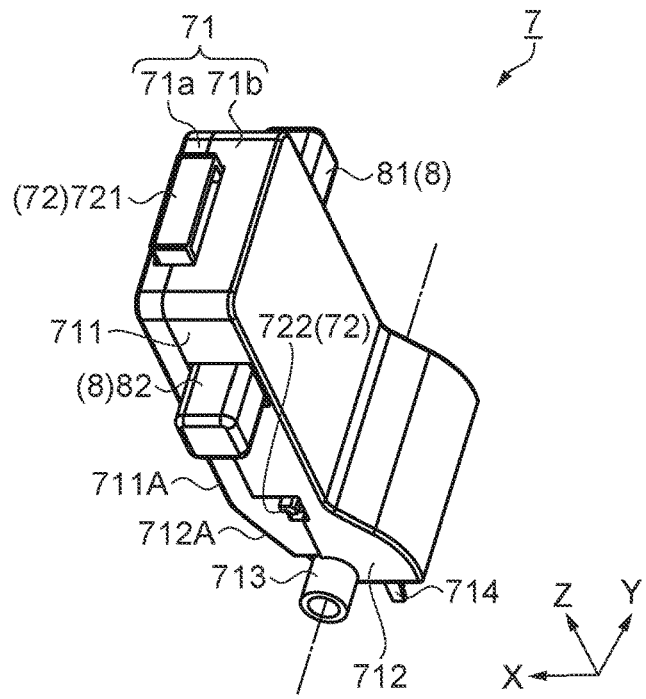
FIG. 8 is a perspective view of a pivot unit in the present embodiment.
Figure 9:
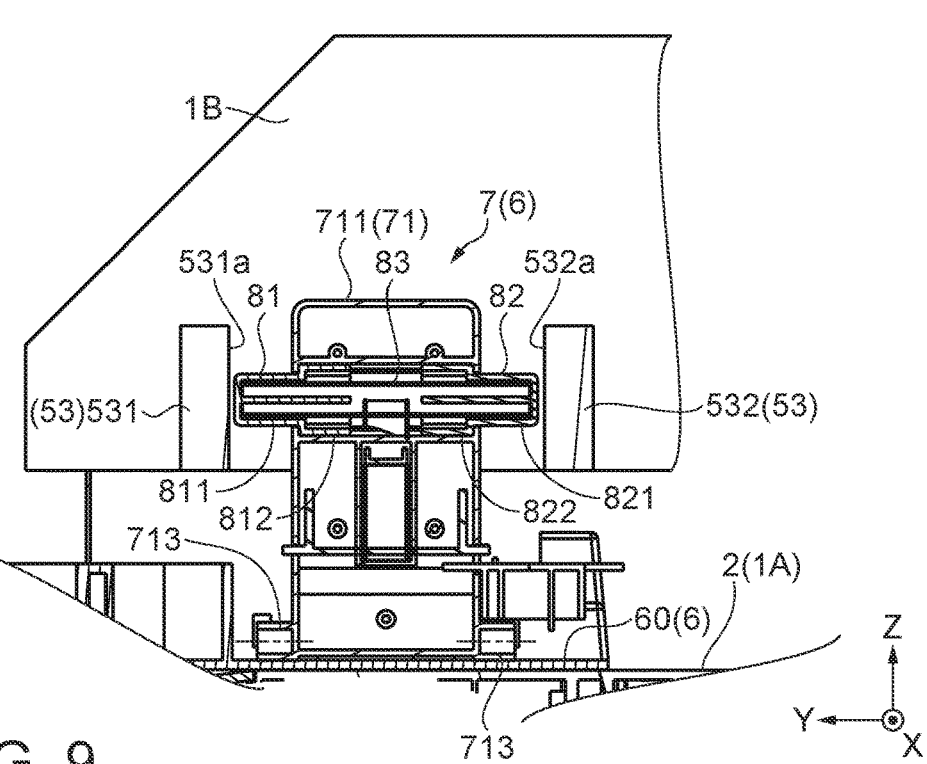
FIG. 9 is a partial cross-sectional view of the projector according to the present embodiment.

FIG. 8 is a perspective view of the pivot unit 7 and shows the pivot unit 7 pivotably supported by the mounting seat section 61 in the first state and viewed obliquely from the rear. FIG. 9 is a partial cross-sectional view of the projector 1 and shows the damping mechanism 6 and the vicinity thereof in the first state viewed from the +X side.

The pivot unit 7 includes an enclosure 71 as a standing portion, a lock member 72, and the damper 8, as shown in FIGS. 8 and 9. The damper 8 includes a first movable member 81, a second movable member 82, and a coil spring 83.

The enclosure 71 is a combination of a first case 71a and a second case 71b and includes an accommodation section 711, which has a box-like shape and extends in the Z direction, and a bent section 712, as shown in FIG. 8.

The accommodation section 711 accommodates the damper 8 and the lock member 72 and has openings that expose front end portions of the damper 8 (projecting sections 811 and 821, which form parts of first movable member 81 and second movable member 82 and will be described later) and a button section 721, which is part of the lock member 72 and will be described later.

The bent section 712 is provided on the −Z side of the accommodation section 711 and is so formed as to be bent relative to the accommodation section 711. The bent section 712 has an outer surface (inclining surface 712A) that inclines obliquely toward the −X side with respect to a +X-side outer surface 711A of the accommodation section 711. The bent section 712 further has openings through which shaft sections 713, a locking section 714, and protruding sections 722, which are part of the lock member 72 and will be described later, are exposed.

The shaft sections 713 have a circularly columnar shape, protrude from the front and rear sides of the bent section 712, and are pivotably supported by the bearing portions of the mounting seat section 61. The locking section 714 protrudes from the lower side of the bent section 712.

When the pivot unit 7 in the first state (see FIG. 6), in which the pivot unit 7 stands relative to the mounting seat section 61, is caused to pivot from the position in the first state to a predetermined position, the damping mechanism 6 transitions to the second state (see FIG. 7), in which the inclining surface 712A comes into contact with the bottom surface 611b of the base section 60. That is, the state of the damping mechanism 6, in which the pivot unit 7 is configured to be pivotable around the center axis of the shaft sections 713 (center axis along Y direction), is switched between the first state and the second state by the pivotal motion of the enclosure 71.

The lock member 72 includes the button section 721, which is exposed through the accommodation section 711, and the protruding sections 722, which are exposed through the bent section 712, as shown in FIG. 8, and restricts the pivotal motion of the pivot unit 7 in the first state.

The button section 721 protrudes upward beyond the accommodation section 711. The protruding sections 722 protrude frontward and rearward beyond the bent section 712.

The lock member 72 is so configured that when the button section 721 is pressed, the amount of overhang of the protruding sections 722 beyond the bent section 712 decreases, whereas when the pressing of the button section 721 is released, the amount of overhang of the protruding sections 722 beyond the bent section 712 increases.

The damper 8 includes the first movable member 81, the second movable member 82, and the coil spring 83, as described above.

The first movable member 81 has a projecting section 811, which has a box-like shape and is exposed through the +Y side of the accommodation section 711, and a seat section 812, which is disposed in the accommodation section 711 and has an outer shape greater than the outer shape of the projecting section 811, as shown in FIGS. 8 and 9. The first movable member 81 is formed in a hollow shape that opens on the side opposite the projecting section 811.

The second movable member 82 is formed in the same manner as the first movable member 81 is formed and has a projecting section 821, which is exposed through the −Y side of the accommodation section 711, and a seat section 822, which is disposed in the accommodation section 711.

The coil spring 83 is disposed in the first movable member 81 and the second movable member 82, as shown in FIG. 9, and urges the first movable member 81 and the second movable member 82 in the direction in which they move away from each other. When the seat sections 812 and 822 come into contact with the inner surface of the accommodation section 711, further movement of the first movable member 81 and the second movable member 82 urged by the coil spring 83 is restricted.

When the projecting sections 811 and 812 are pressed, the amounts of jutting of the first movable member 81 and the second movable member 82 beyond the enclosure 71 change in accordance with the pressing force.

The damping mechanism 6 in the second state (see FIG. 7) is attached to the image forming apparatus 1A to which the projection optical apparatus 1B is attached.

Figure 10:
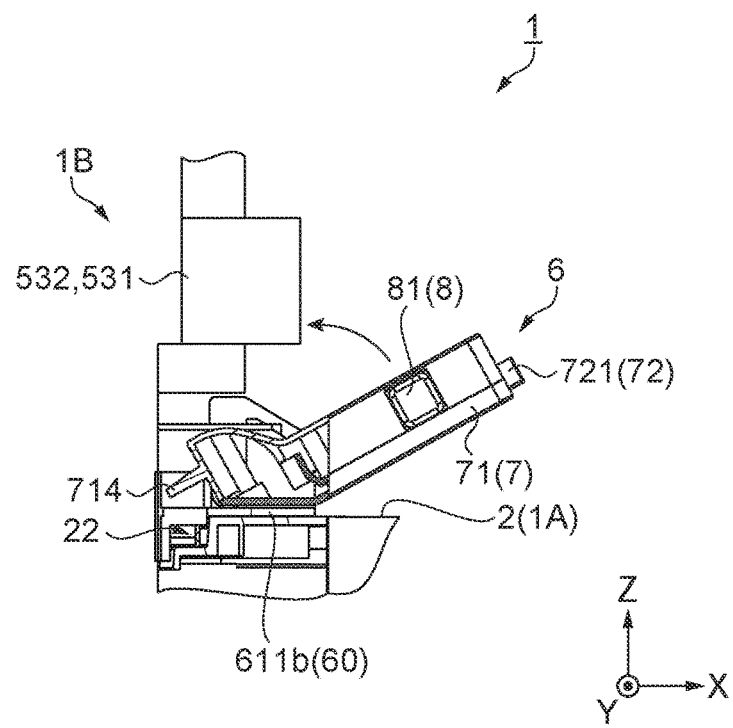
FIG. 10 is a partial cross-sectional view of the projector in the present embodiment.

FIG. 10 is a partial cross-sectional view of the projector 1. Specifically, FIG. 10 shows the positional relationship between the pivot unit 7 and the projection optical apparatus 1B in the state in which the damping mechanism 6 is attached to the image forming apparatus 1A and shows the +X-side pivot unit 7 and the vicinity thereof viewed from the front (+Y side).

In the second state of the damping mechanism 6, the pivot unit 7 is separate from the first wall section 531 and the second wall section 532, as shown in FIG. 10, whereby the damping mechanism 6 can be attached to the image forming apparatus 1A by causing the damping mechanism 6 to slide from a position in front of the image forming apparatus 1A. Specifically, the damping mechanism 6 is caused to slide rearward until the base section 60 is fit into the recessed section 22 (see FIG. 4) of the exterior enclosure 2. More specifically, the damping mechanism 6 is so fit into the recessed section 22 that the protrusion 622 (see FIG. 7) of the base section 60 is inserted into the corresponding insertion hole 221 (see FIG. 4) and the protrusion (not shown) of the base section 60 is inserted into the corresponding guide groove 222 (see FIG. 4).

Thereafter, when the pivot unit 7 is caused to pivot to the first state with the button section 721 of the lock member 72 pressed and the pressing of the button section 721 is released, the protruding sections 722 (see FIG. 8) of the lock member 72 engage with the base section 60, so that the pivotal motion of the pivot unit 7 is restricted and the first state is achieved, whereby the damping mechanism 6 is mounted on the image forming apparatus 1A (mounted state). In the mounted state, the locking section 714 engages with the -Y side of the corresponding protrusion 223 of the exterior enclosure 2, as shown in FIG. 5, so that the movement of the damping mechanism 6 toward the +Y side is restricted.

Figure 11:
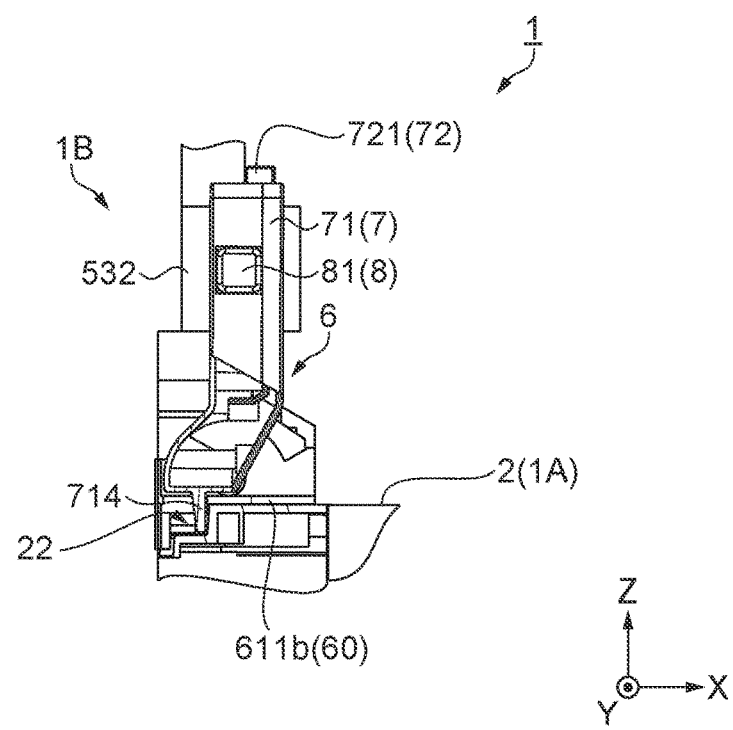
FIG. 11 is a partial cross-sectional view of the projector in the present embodiment.

FIG. 11 is a partial cross-sectional view of the projector 1 and shows the +X-side pivot unit 7 and the vicinity thereof in the damping mechanism 6 in the mounted state viewed from the front (+Y side).

In the mounted state (first state) of the damping mechanism 6, the enclosure 71 stands relative to the exterior enclosure 2, and the damper 8 is located between the first wall section 531 and the second wall section 532, as shown in FIGS. 9 and 11. More specifically, the damper 8 is so located that the first movable member 81 faces the first flat surface 531a and the second movable member 82 faces the second flat surface 532a, as shown in FIG. 9. Further, in the projector 1 according to the present embodiment, in a stationary state in which no external force acts on the projector 1, the first movable member 81 and the first flat surface 531a are so set as to be slightly separate from each other and so are the second movable member 82 and the second flat surface 532a. Since the damper 8 is separate from the damper receivers 53 in the stationary state, as described above, the lens shift mechanism 3Sh can smoothly move the projection optical apparatus 1B.

On the other hand, the damping mechanism 6 is so configured that when the button section 721 of the lock member 72 is pressed in the mounted state, the engagement of the protrusions 722 with the base section 60 is released, so that the pivot unit 7 is allowed to pivot. When the pivot unit 7 is caused to pivot from the first state to the state in which the inclining surface 712A comes into contact with the bottom surface 611b of the base section 60, the enclosure 71 inclines with respect to the base section 60, so that the second state is achieved (see FIG. 10). In the second state, the damper 8 is located outside the space between the first wall section 531 and the second wall section 532. Further, since the engagement between the locking section 714 and the corresponding protrusion 223 is released, the damping mechanism 6 can to be detached from the image forming apparatus 1A by causing the damping mechanism 6 to slide frontward.

As described above, the state of the damping mechanism 6 is switched between the first state and the second state by the pivotal motion of the enclosure 71 and attached to and detached from the image forming apparatus 1A.

Action of Damping Mechanism

The action of the damping mechanism 6 in the mounted state (first state) will be described with reference to FIG. 5.

In the case where the projector 1 is installed on a desktop or any other surface or in other cases, impact is applied in some cases to the image forming apparatus 1A depending on how to handle the projector 1.

The flange section 512 and the position of the center of gravity G are separate from each other in the projection optical apparatus 1B, as described above. Therefore, when impact is applied to the image forming apparatus 1A, force that causes the center of gravity G to swing relative primarily to the flange section 512 as a fixed end acts on the projection optical apparatus 1B. Since the flange section 512 can be considered as a rigid portion, it is believed that the force acting on the projection optical apparatus 1B causes the position of the center of gravity G to oscillate with respect to a pivotal point between a point of the flange section 512 that is closest to the center of gravity G (upper end 512A of flange section 512 in FIG. 5) and a point of the flange section 512 that is farthest from the center of gravity G (lower end 512B of flange section 512 in FIG. 5). That is, consider cases where clockwise force and counterclockwise force act on the center of gravity G with respect to the ends 512A and 512B as imaginary pivotal points (centers), and the direction of force that causes the position of the center of gravity G to oscillate with respect to an actual pivotal point can be predicted between the two cases.

A line La, which connects the end 512A to the center of gravity G, inclines with respect to the Z direction by an acute angle, as shown in FIG. 5. The direction of the force that causes the position of the center of gravity G to oscillate with respect to the end 512A is the direction of rotation of the position of the center of gravity G around the end 512A, that is, a tangential direction Ta (not shown) at the position of the center of gravity G and tangential to an arc having a radius from the end 512A to the position of the center of gravity G. The tangential direction Ta inclines with respect to the Y direction by an acute angle.

A line Lb, which connects the end 512B to the center of gravity G, inclines with respect to the Z direction by an acute angle smaller than the acute angle between the line La and the Z direction. The direction of force that causes the position of the center of gravity G to oscillate with respect to the end 512B is a tangential direction Tb (not shown) at the position of the center of gravity G and tangential to an arc having a radius from the end 512B to the position of the center of gravity G. The tangential direction Tb inclines with respect to the Y direction by an acute angle smaller than the acute angle between the Y direction and the tangential direction Ta.

The direction of the force (oscillation force) that causes the position of the center of gravity G to oscillate with respect to the actual pivotal point can be considered to be present between the tangential directions Ta and Tb, that is, the direction of the force and the Y direction form an acute angle smaller than the acute angle between the Y direction and the tangential direction Ta but greater than the acute angle between the Y direction and the tangential direction Tb.

When clockwise oscillation force acts on the center of gravity G of the projection optical apparatus 1B, in which the first wall section 531 and the second wall section 532 face each other in the Y direction, the first wall section 531 presses the first movable member 81 of the damping mechanism 6 (F1 in FIG. 5). On the other hand, when counterclockwise oscillation force acts on the center of gravity G of the projection optical apparatus 1B, the second wall section 532 presses the second movable member 82 of the damping mechanism 6 (F2 in FIG. 5).

The amount of jutting of the damper 8 with respect to the enclosure 71, that is, the amounts of jutting of the first movable member 81 and the second movable member 82 change in accordance with the pressing force produced by the first wall section 531 or the second wall section 532, and the damping mechanism 6 absorbs the pressing force. As a result, the impact applied to the projection optical apparatus 1B is reduced.

As described above, the first wall section 531 and the second wall section 532 face each other in the Y direction (first direction), which intersects the direction along the lines that connects the flange section 512 (supported section) to the center of gravity G. The damping mechanism 6 reduces the impact transmitted to the projection optical apparatus 1B via the image forming apparatus 1A. That is, the damping mechanism 6 absorbs a variation in torque between the image forming apparatus 1A and the projection optical apparatus 1B.

The image forming apparatus 1A in the present embodiment is configured to allow another projection optical apparatus (not shown) having no first wall section 531 or second wall section 532 to be attached to and detached from the image forming apparatus 1A. The image forming apparatus 1A is further configured to allow a cover 9 to be mounted on the image forming apparatus 1A in place of the damping mechanism 6 in the case where the other projection optical apparatus is mounted.

Figure 12:
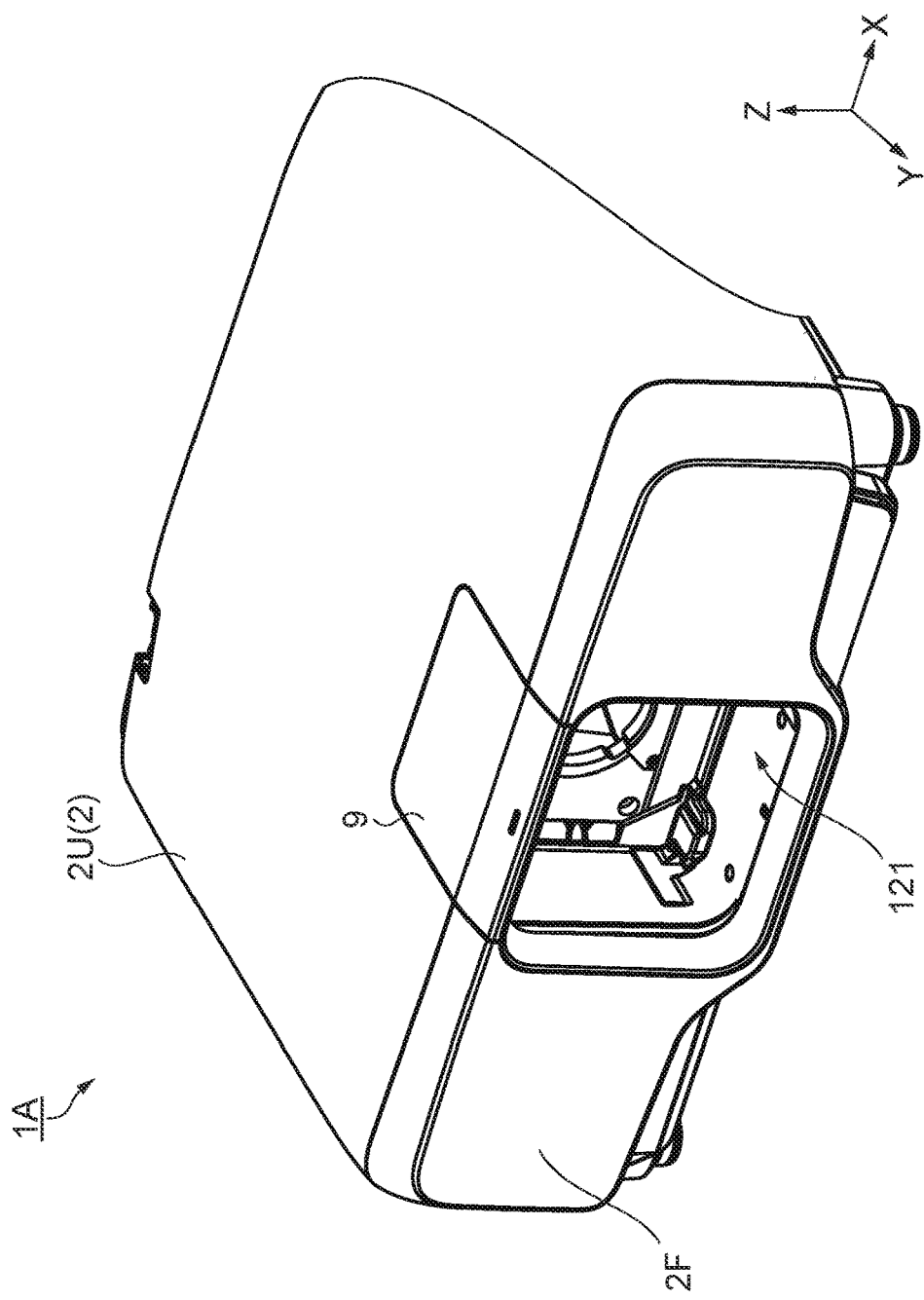
FIG. 12 is a perspective view showing a state in which a cover is mounted on the image forming apparatus in the present embodiment.

FIG. 12 is a perspective view showing the state in which the cover 9 is mounted on the image forming apparatus 1A. The cover 9 is configured to have a shape that follows the upper surface section 2U and fit into the recessed sections 22 (see FIG. 4) as in the case of the damping mechanism 6, as shown in FIG. 12.

When the cover 9 is mounted on the image forming apparatus 1A, an opening 121 is provided in the front surface section 2F, and another projection optical apparatus so formed as not to interfere with the cover 9, for example, a projection optical apparatus that projects an image on the +Y side can be mounted on the image forming apparatus 1A.

As described above, according to the present embodiment, the following effects can be provided.

(1) The projection optical apparatus 1B includes the first wall section 531 and the second wall section 532 in addition to the flange section 512. Therefore, even in the configuration in which the projection optical apparatus 1B has a large weight or has the center of gravity G in a position separate from the flange section 512, the projection optical apparatus 1B provided by the present embodiment can be stably supported by the image forming apparatus 1A.

(2) In the projector 1, the damping mechanism 6 reduces impact transmitted to the projection optical apparatus 1B. As a result, even when impact is applied to the projector 1, breakage of the flange section 512, the lens shift mechanism 3Sh, which supports the flange section 512, and other portions can be avoided. Therefore, even in the configuration including the projection optical apparatus 1B having a large weight or having the center of gravity G in a position separate from the flange section 512, for example, to increase the divergent angle of image light incident on the projection optical apparatus 1B or to change the projection direction, the projector 1 provided by the present embodiment can be excellent in impact resistance.

(3) The first wall section 531 and the second wall section 532 are provided on the second accommodation section 52, which accommodates the second optical system 42. As a result, even in the case of the projection optical apparatus 1B, which has the center of gravity G shifted toward the second accommodation section 52, vibration of the projection optical apparatus 1B due to impact can be efficiently suppressed. The projector 1 provided by the present embodiment can therefore project an image in a direction different from the traveling direction of the light outputted from the image forming apparatus 1A and excel in impact resistance.

Further, since the projection optical apparatus 1B includes the lens that increases the divergent angle of the light incident thereon, a short-throw projector that excels in impact resistance can be provided.

(4) Since the first wall section 531, the second wall section 532, and the damper 8 are provided on opposite sides of the second accommodation section 52, vibration of the projection optical apparatus 1B due to impact can be suppressed in a well-balanced manner. The projector 1 provided by the present embodiment can be further excellent in impact resistance.

Further, since the first wall sections 531, the second wall sections 532, and the damping mechanism 6 can be configured with the amounts of overhang thereof from the second accommodation section 52 suppressed in the Z direction, an increase in size of the projector 1 in the Z direction can be suppressed.

(5) Since the first wall section 531 and the second wall section 532 are so formed that the sides thereof facing each other are flat surfaces (first flat surface 531a, second flat surface 532a), the damper 8 can be stably pressed by the first wall section 531 and the second wall section 532 with no precise arrangement of the damper 8 in the direction along the flat surfaces. Further, moving the damper 8 in the direction along the flat surfaces allows the damper 8 to be disposed between the first wall section 531 and the second wall section 532. The projector 1 provided by the present embodiment can therefore be provided with the damping mechanism 6 that allows the damper 8 to each be readily disposed in a predetermined position.

(6) In the projector 1, since the first flat surface 531a and the second flat surface 532a of the projection optical apparatus 1B are perpendicular to the first optical axis 41Ax, the damping mechanism 6 is allowed to function even in the configuration including the lens shift mechanism 3Sh. Therefore, even in the configuration including not only the projection optical apparatus 1B having a large weight or having the center of gravity G in a position separate from the flange section 512 but the lens shift mechanism 3Sh, the projector 1 provided by the present embodiment can be excellent in impact resistance.

(7) The state of the damping mechanism 6 is switched between the first state and the second state by the pivotal motion of the enclosure 71. The state in which the damping mechanism 6 functions and the state in which the damper mechanism 6 does not function can therefore be readily switched from one to the other without disassembly of the damping mechanism 6, whereby the projector 1 provided by the present embodiment can include the damping mechanism 6 that is easily handled.

(8) The damping mechanism 6 is configured to be attachable to and detachable from the exterior enclosure 2. Therefore, to mount another projection optical apparatus that includes no first wall section 531 or second wall section 532 and therefore has a small weight on the image forming apparatus 1A, the damping mechanism 6 can be removed from the exterior enclosure 2. A projector that allows projection optical apparatus having a variety of weights to be attached to and detached from the projector and has a satisfactory exterior appearance of the projector on which the other projection optical apparatus is mounted can be provided.

Variations

The invention is not limited to the embodiment described above, and a variety of changes, improvements, and other modifications can be made to the embodiment described above. Variations will be described below.

The projection optical apparatus 1B in the embodiment described above includes an optical system that successively deflects twice the direction of the light outputted from the image forming apparatus 1A (optical system having roughly U-letter shaped optical path), but the configuration described above is not necessarily employed. For example, a configuration in which the direction of the light outputted from the image forming apparatus 1A is deflected once and the light is projected on the +Z side (optical system having roughly L-letter shaped optical path) may be employed. Still instead, the invention is also applicable to a configuration in which the direction of the light outputted from the image forming apparatus 1A is not deflected in a different direction but the light is projected on the +Y side.

The damping mechanism 6 in the embodiment described above is so configured that the base section 60 is integrated with the pair of pivot units 7 and the pivot units 7 are each pivotable relative to the base section 60, but the configuration described above is not necessarily employed. For example, a base member corresponding to the base section 60 and a pair of units each including the damper 8 and the standing portion may be so configured that the base member and the pair of units are separate from each other, and after the base member is mounted on the image forming apparatus 1A, the pair of units may be inserted into the base member to locate the damper 8 in predetermined positions.

The damping mechanism 6 in the embodiment described above includes the base section 60, but a configuration in which the base section 60 is omitted may be employed, and a damping mechanism including pivot units pivotably supported by the exterior enclosure 2 may be employed.

The projector 1 according to the embodiment described above includes the lens shift mechanism. 3Sh, but the projector 1 may not include the lens shift mechanism 3Sh. In this configuration, the first wall section 531 and the second wall section 532 do not necessarily have sides facing each other and only need to have shapes that allow stable contact with the front end portions of the damper 8 (front end portions of first movable member 81 and second movable member 82).

The projector 1 according to the embodiment described above is provided with the pair of damper receivers 53 and the pair of pivot units 7 (two pairs), but an aspect in which a set of the damper receiver 53 and the pivot unit 7 are provided may be employed. For example, it is conceivable to employ a configuration in which the set described above is provided behind the vertically extending section 521 of the projection optic enclosure 5.

The projection optical apparatus 1B in the embodiment described above is attached to the image forming apparatus 1A with screws. The projection optical apparatus 1B may instead be attached to the image forming apparatus 1A by using what is called a spigot method, in which the image forming apparatus 1A is provided with a rotating member and the projection optical apparatus 1B is locked by rotation of the rotating member.

In each of the damper 8 in the embodiment described above, the coil spring 83 is used as the member that urges the first movable member 81 and the second movable member 82, but not necessarily. For example, a plate spring or any other component may be used.

In the projector 1 according to the embodiment described above, the damping mechanism 6 is supported by the image forming apparatus 1A, and the damper receivers 53 are provided as part of the projection optical apparatus 1B. Instead, a projector including a damping mechanism supported by the projection optical apparatus 1B and an image forming apparatus provided with damper receivers may be configured.

Still instead, an installation surface or wall on which the projector is installed can be used to allow the damping mechanism to function. For example, a difference in torque between the image forming apparatus and the projection optical apparatus can be absorbed by employing a configuration in which a damping mechanism is supported by the projection optical apparatus 1B and dampers in the damping mechanism are allowed to come into contact with the installation surface or wall.

In the projector 1 according to the embodiment described above, a transmissive liquid crystal panel is used as each of the light modulators 351, but a reflective liquid crystal panel may be used.

Further, the light modulators 351 in the embodiment described above employ what is called a three-panel method using three light modulators corresponding to the R light, the G light, and the B light, but not necessarily, and may instead employ a single-panel method. The invention is also applicable to a projector including two light modulators or four or more light modulators.

The light modulators may each be a micromirror-type light modulator, for example, a light modulator using a DMD (digital micromirror device).

The light source apparatus 31 in the embodiment described above uses the discharge-type light source 311 and may instead be formed of a light source based on a different method, a light emitting diode, a laser, or any other solid-state light source.

The entire disclosure of Japanese Patent Application No. 2017-013922, filed Jan. 30, 2017 is expressly incorporated by reference herein

What is claimed is:

1. A projector that projects image light, the projector comprising:
an image forming apparatus that includes a light source, a light modulator, and an exterior enclosure and outputs the image light;
a projection optical apparatus that is removably supported by the image forming apparatus and projects the image light; and
a damping mechanism that is supported by the image forming apparatus or the projection optical apparatus and absorbs a variation in torque between the image forming apparatus and the projection optical apparatus, wherein the damping mechanism is disposed at least partially outside the image forming apparatus and the projection optical apparatus.

2. The projector according to claim 1, wherein
the projection optical apparatus includes
an optical system, and
a projection optic enclosure that accommodates the optical system,
the optical system includes a first optical system on which the image light is incident,
the projection optic enclosure includes
a first accommodation section that accommodates the first optical system and includes a supported section supported by the image forming apparatus, and
a first wall section and a second wall section that face each other in a first direction that intersects a direction along a line that connects the supported section to a center of gravity of the projection optical apparatus,
the damping mechanism is supported by the image forming apparatus and includes
a standing section that stands from the exterior enclosure, and
a damper that is so supported by the standing section as to be disposed between the first wall section and the second wall section and juts out relative to the standing section by an amount that changes in accordance with pressing force produced by the first wall section or the second wall section.

3. The projector according to claim 2, wherein
the optical system includes a second optical system that changes a traveling direction of light having exited out of the first optical system and has a second optical axis along a direction that intersects a first optical axis of the first optical system,
the projection optic enclosure has a second accommodation section that accommodates the second optical system, and
the first wall section and the second wall section are provided on the second accommodation section.

4. The projector according to claim 2, wherein
the first wall section and the second wall section have sides facing each other and formed of flat surfaces.

5. The projector according to claim 4, wherein
the flat surfaces are surfaces that intersect the first optical axis.

6. The projector according to claim 3, wherein
the first wall section and the second wall section are provided on opposite sides of the second accommodation section in a direction that intersects the first optical axis and the second optical axis, and
the damping mechanism includes a pair of the standing sections and a pair of the dampers in correspondence with the first wall section and the second wall section provided on the opposite sides of the second accommodation section.

7. The projector according to claim 2, wherein
a state of the damping mechanism is switched by pivotal motion of the standing section between a first state in which the damper is located in a space between the first wall section and the second wall section and a second state in which the damper is located outside the space between the first wall section and the second wall section.

8. The projector according to claim 2, wherein
the damping mechanism is configured to be attachable to and detachable from the exterior enclosure.

9. A projector that projects image light, the projector comprising:
an image forming apparatus that includes a light source, a light modulator, and an exterior enclosure and outputs the image light;
a projection optical apparatus that is removably supported by the image forming apparatus and projects the image light; and
a damping mechanism that is supported by the image forming apparatus or the projection optical apparatus and absorbs a variation in torque between the image forming apparatus and the projection optical apparatus, wherein
the projection optical apparatus includes
an optical system, and
a projection optic enclosure that accommodates the optical system,
the optical system includes a first optical system on which the image light is incident,
the projection optic enclosure includes
a first accommodation section that accommodates the first optical system and includes a supported section supported by the image forming apparatus, and
a first wall section and a second wall section that face each other in a first direction that intersects a direction along a line that connects the supported section to a center of gravity of the projection optical apparatus,
the damping mechanism is supported by the image forming apparatus and includes
a standing section that stands from the exterior enclosure, and
a damper that is so supported by the standing section as to be disposed between the first wall section and the second wall section and juts out relative to the standing section by an amount that changes in accordance with pressing force produced by the first wall section or the second wall section.

* * * * *